W. D. Guseman.
Running Gear.
Nº 17,369.   Patented May 26, 1857.
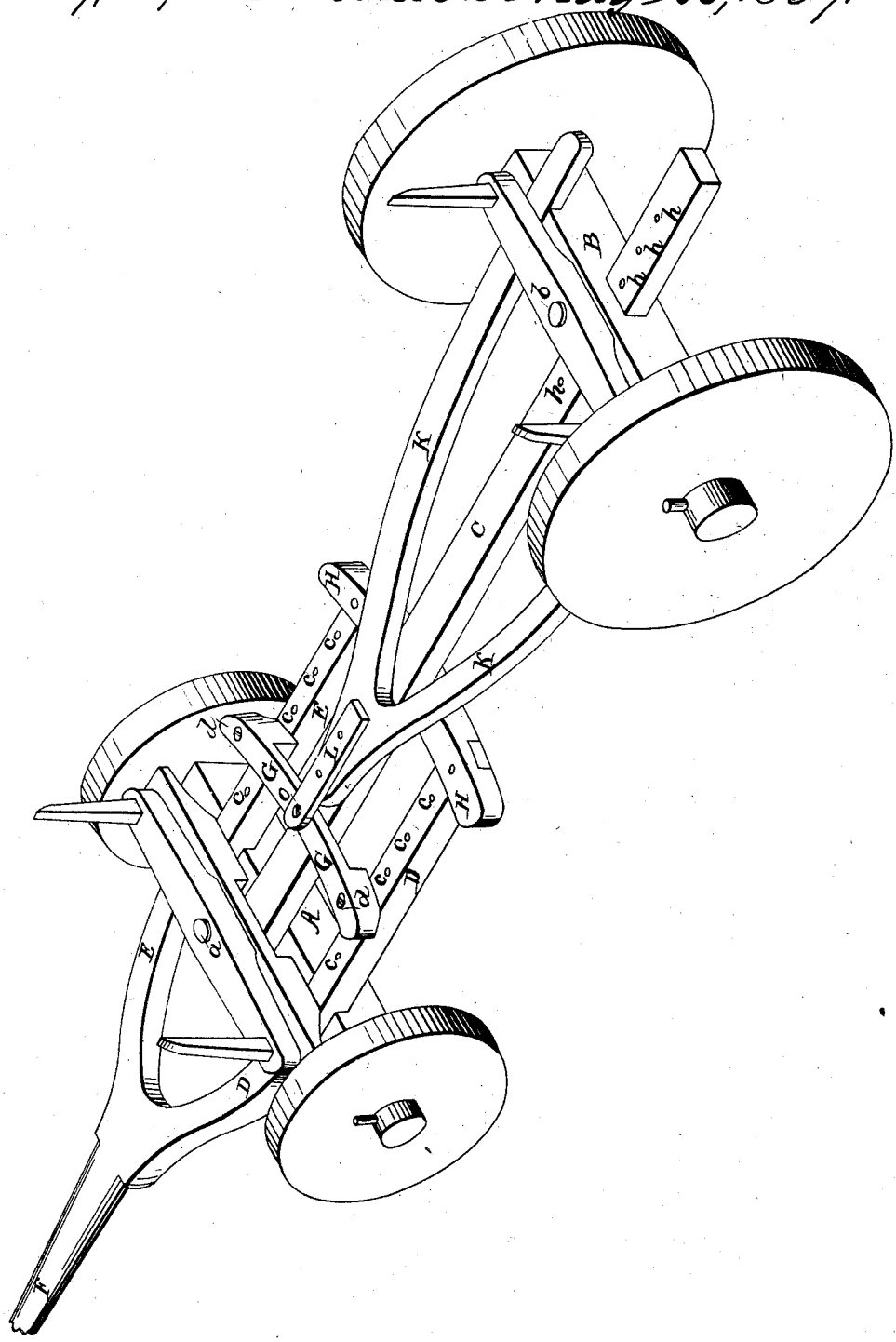

UNITED STATES PATENT OFFICE.

W. D. GUSEMAN, OF MORGANTOWN, VIRGINIA.

WAGON-COUPLING.

Specification of Letters Patent No. 17,369, dated May 26, 1857.

*To all whom it may concern:*

Be it known that I, W. D. GUSEMAN, of Morgantown, in the county of Monongalia and State of Virginia, have invented certain new and useful Improvements in the Construction of Wagon-Couplings; and I do hereby declare that the following is a full and exact description thereof, reference being had to the accompanying drawings, which represent a perspective view of said improved wagon-coupling.

The nature of my invention relates to the coupling of the hind and fore wheels of a wagon, so that the turning of the fore wheels shall turn the hind wheels, and cause them to "track" as it is termed, when the devices used for this purpose will admit of bringing the hind and fore wheels nearer to or removing them farther from each other as may be required, without in any manner affecting this tracking operation.

To enable others skilled in the art to make and use my invention, I will proceed to describe its construction and operation.

A, A, represents the front and B the rear axle of an ordinary wagon, each mounted on wheels in the common manner. These axles are coupled together by the usual coupling pole C, having any number of adjusting holes $h$, in it, and of such a length as will make the wagon adaptable to any kind of hauling. The usual king bolts $a$ and $b$, pass through the axles and coupling pole C.

D and E, are the front hounds to which the tongue F, is connected, they extend rearward some distance, their extreme ends being connected together by a bar H. The hounds K, K, which are united at their front ends are fastened stiffly to the rear axle B, the front end of the pieces K, beyond where they unite, are pivoted by means of the piece L, to the cross bar G; this cross bar G is secured to the hounds D and E, by means of the screw bolts $d$, which pass through two of the holes $c$ in the hounds D and E, the holes $c$, are arranged at equal distances from each other on said hounds, and serve to adjust the position of the cross bar G, the distance that the holes $c$, are from each other is equal to that of the distance of the holes $h$, from each other; thus by withdrawing the bolts $d$, and king bolt $b$, the distance between the axles can be increased or diminished and consequently the leverage in regard to pivot $o$, will be increased or diminished causing the hind wheels to follow the track of the fore wheels, in a true manner, no matter to what extent the coupling is extended or shortened.

Having thus fully described the nature of my invention, what I claim therein as new, and desire to secure by Letters Patent, is—

Coupling the hind and fore wheels of a wagon, by means of an adjustable reach C, and a correspondingly adjustable piece G, on the front hounds, to which the rear hounds are pivoted, the whole being combined and operating together substantially in the manner herein set forth.

W. D. GUSEMAN.

Witnesses:
   EDWIN CLEAR,
   SAMUEL HOWELL.